(12) United States Patent
Takada (10) Patent No.: US 7,710,056 B2
(45) Date of Patent: May 4, 2010

(54) BRUSHLESS DC MOTOR AND ELECTRIC APPARATUS MOUNTING IT

(75) Inventor: Masayuki Takada, Aichi (JP)

(73) Assignee: Panasonic Corporation, Osaka (JP)

( * ) Notice: Subject to any disclaimer, the term of this patent is extended or adjusted under 35 U.S.C. 154(b) by 371 days.

(21) Appl. No.: 11/575,355

(22) PCT Filed: Nov. 14, 2005

(86) PCT No.: PCT/JP2005/020797

§ 371 (c)(1),
(2), (4) Date: Mar. 15, 2007

(87) PCT Pub. No.: WO2006/054502

PCT Pub. Date: May 26, 2006

(65) Prior Publication Data

US 2008/0303464 A1    Dec. 11, 2008

(30) Foreign Application Priority Data

Nov. 18, 2004    (JP)    ............................. 2004-334147

(51) Int. Cl.
     *H02P 6/08*      (2006.01)
(52) U.S. Cl. ............................. 318/400.17; 318/400.01; 318/3
(58) Field of Classification Search ............ 318/400.17, 318/400.01, 3
See application file for complete search history.

(56) References Cited

U.S. PATENT DOCUMENTS 5,510,688 A * 4/1996 Schwarz ..................... 318/801
5,739,650 A * 4/1998 Kimura et al. ......... 318/400.07
6,683,397 B2 * 1/2004 Gauthier et al. ........... 310/68 B
7,112,936 B2 * 9/2006 Lee ........................ 318/400.01
7,292,004 B2 * 11/2007 Ueda et al. ................... 318/805
7,328,500 B2 * 2/2008 Kim et al. ..................... 29/609
2004/0165868 A1    8/2004 Sato et al.

FOREIGN PATENT DOCUMENTS

| JP | 2000-41370 A | 2/2000 |
|---|---|---|
| JP | 2000-41395 A | 2/2000 |
| JP | 2001-193688 A | 7/2001 |
| JP | 2002-10609 A | 1/2002 |
| JP | 2002-247879 A | 8/2002 |
| JP | 2003-284307 A | 10/2003 |
| JP | 2004-180476 A | 6/2004 |
| WO | WO 03/015254 A | 2/2003 |

OTHER PUBLICATIONS

International Search Report for PCT/JP2005/020797, dated Dec. 27, 2005.

* cited by examiner

*Primary Examiner*—Walter Benson
*Assistant Examiner*—David S Luo
(74) *Attorney, Agent, or Firm*—RatnerPrestia (57) ABSTRACT

Current control circuit controls an output voltage of DC power supply so as to increase current passing through inverter circuit as the motor increases its speed. The control offers an RPM—torque characteristic of the motor in which torque increases as the RPM increases. By virtue of the RPM—torque characteristic, a ventilating device employing brushless DC motor exhibits preferable air quantity—static pressure characteristic where less change in air quantity is expected even when a pressure loss—outside wind pressure, duct length or the like—varies.

16 Claims, 14 Drawing Sheets

BRUSHLESS DC MOTOR AND ELECTRIC APPARATUS MOUNTING IT

This application is a U.S. National Phase Application of PCT International Application PCT/JP2005/020797.

TECHNICAL FIELD

The present invention relates to a brushless DC motor, particularly relates to a brushless motor for driving an air blower.

BACKGROUND ART

Figure 14:
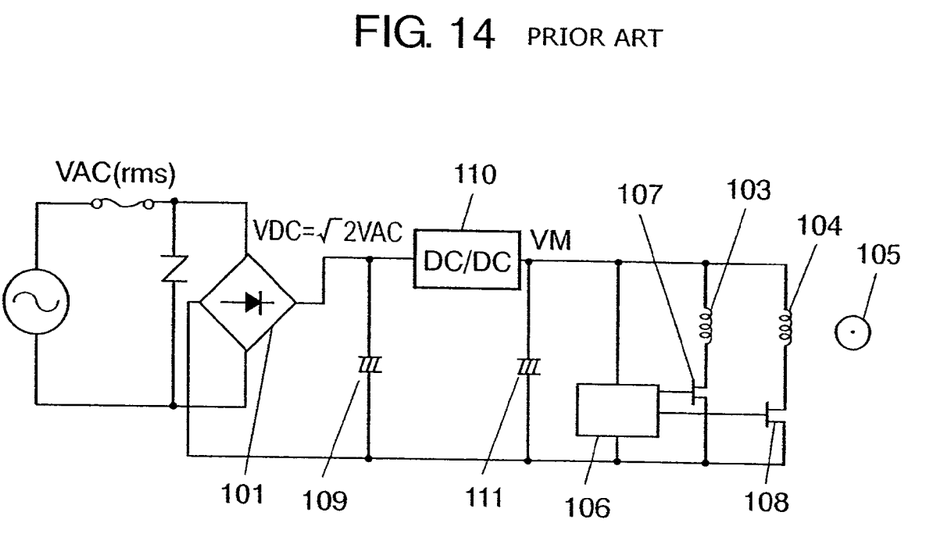
FIG. 14 is a circuit diagram of a conventional brushless DC motor.

FIG. 14 shows a conventional brushless DC motor, which is disclosed in Japanese Patent Unexamined Publication No. 2003-284307. The motor contains rectifier 101 for rectifying voltage VAC of AC power supply; DC-DC converter 110 for converting rectified DC voltage ($\sqrt{2}$)·VAC into low DC voltage VM; smoothing capacitors 109, 111; motor stator-coils 103, 104; magnet rotor 105; switching elements 107, 108; Hall element (not shown) for detecting the magnetic pole of the rotor; and control circuit 106. Control circuit 106 rotates the motor by turning on/off switching elements 107, 108 using a signal from the Hall element and, at the same time, controls the characteristics of the motor so as to be suitable for use.

SUMMARY OF THE INVENTION

The present invention offers a brushless DC motor suitable for driving an air blower.

The brushless DC motor of the present invention includes a stator having a stator coil; a permanent-magnet rotor disposed opposite to the stator; a rotor magnetic-field detecting element for detecting a magnetic field of the permanent-magnet rotor; a rectifying circuit for rectifying AC voltage of AC power supply in full-wave; a DC power supply for converting the voltage rectified by the rectifying circuit into a low DC voltage; an inverter circuit having a plurality of switching elements in full-wave bridge connection, to which the DC voltage is applied; a driving logic circuit for controlling the switching elements to pass current through the stator coil; and a current control circuit for controlling current passing through the inverter circuit. The current control circuit increases the current in the inverter circuit as speed of the motor increases.

Employing such structured brushless DC motor of the present invention for a ventilating device offers less change in air quantity even when a pressure loss-outside wind pressure, duct length or the like-varies.

REFERENCE MARKS IN THE DRAWINGS

| | |
|---|---|
| 1, 30, 38, 43 | brushless DC motor |
| 2 | stator coil |
| 3 | permanent-magnet rotor |
| 4 | Hall element (rotor magnetic-field detecting element) |
| 5, 34 | driving logic circuit |
| 6 | inverter circuit |
| 7, 33 | current-waveform control circuit |
| 8 | DC power supply |
| 9 | rectifying circuit |
| 10 | stator |
| 12 | rotor magnetic-field output circuit |
| 15 | AC-power-supply connecting terminal |
| 17, 40 | current-value change circuit |
| 19 | current-indicating circuit |
| 20 | set-value change circuit |
| 21 | current detecting circuit |
| 22 | current control circuit |
| 31 | duty indicating circuit |
| 32 | PWM control circuit |
| 39 | voltage-range judging circuit |
| 44 | low DC-voltage leading terminal |
| 45 | current-setting input terminal |
| 46 | current setting circuit |
| 49 | voltage reducing circuit |
| 50 | AC power supply |

DETAILED DESCRIPTION OF THE PREFERRED EMBODIMENTS

The embodiments of the present invention are described hereinafter with reference to the accompanying drawings.

First Exemplary Embodiment

Figure 1:
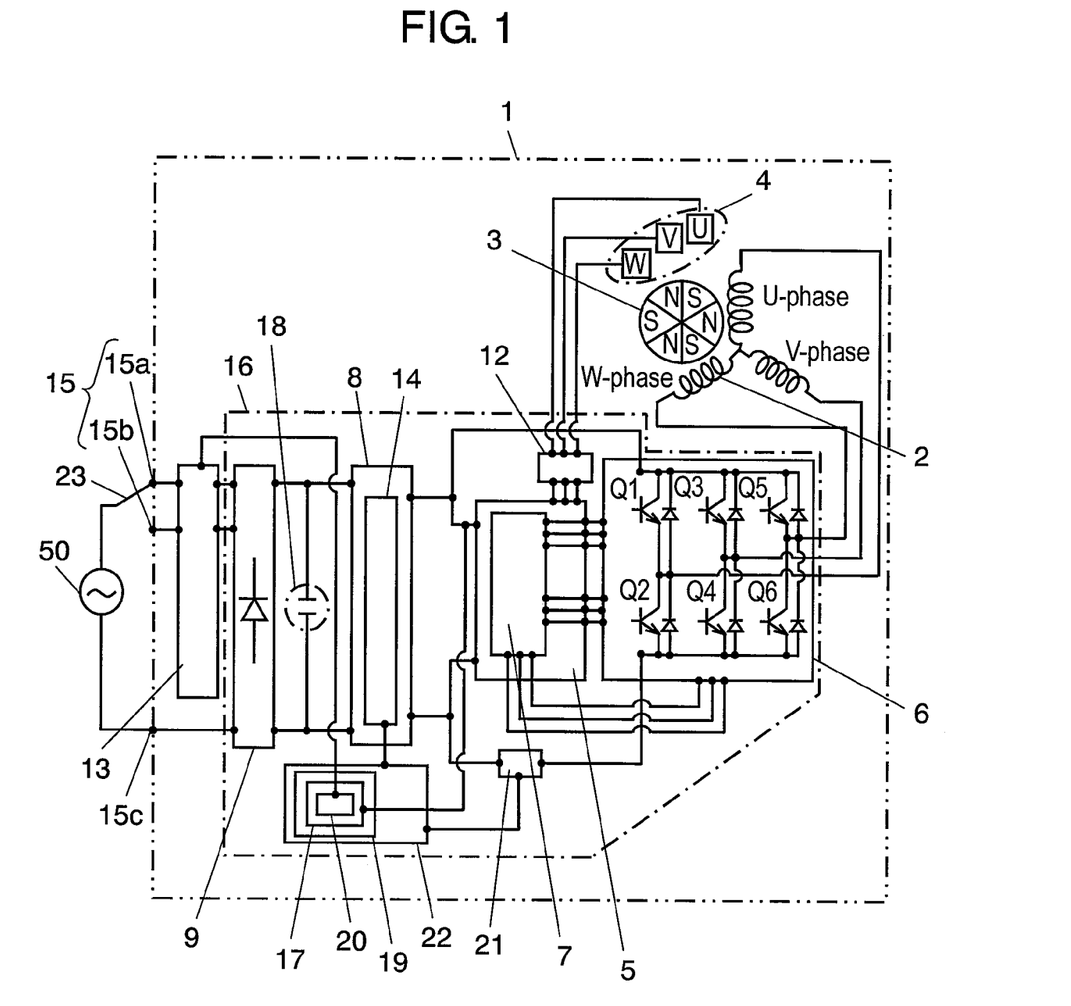
FIG. 1 is a block diagram showing a structure of a brushless DC motor in accordance with a first exemplary embodiment of the present invention.
Figure 2:
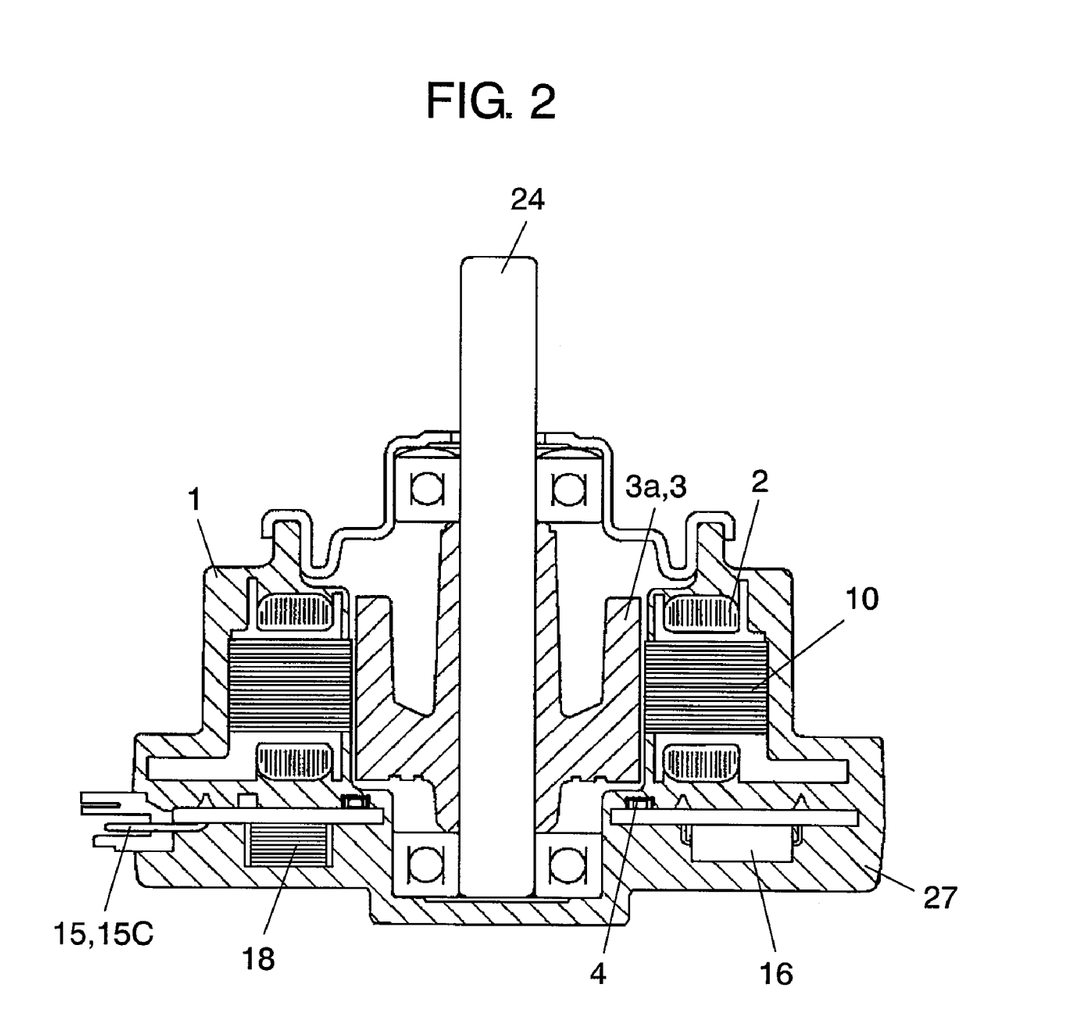
FIG. 2 is a section view of the motor in accordance with the first exemplary embodiment of the present invention.

FIG. 1 is a block diagram showing a structure of a brushless DC motor in accordance with the first exemplary embodiment of the present invention. FIG. 2 is a section view of the motor.

The brushless DC motor 1 (hereinafter, motor 1) is formed of the following components: stator 10 having stator coil 2; permanent-magnet rotor 3 disposed opposite to stator 10; Hall element 4 as a rotor magnetic-field detecting element for detecting a magnetic field of permanent-magnet rotor 3; rectifying circuit 9 for rectifying AC voltage of AC power supply 50 in full-wave; DC power supply 8 for converting the voltage rectified by rectifying circuit 9 into a low DC voltage; inverter circuit 6 having a plurality of switching elements Q1 through Q6 in full-wave bridge connection, to which the low DC voltage is applied; driving logic circuit 5 for controlling switching elements Q1 through Q6 to pass current through stator coil 2; and current control circuit 22 for controlling the current passing through inverter circuit 6. Current control circuit 22 increases the current in inverter circuit 6 as the speed of the motor increases.

Here will be detailed the motor shown in FIGS. 1 and 2 of the embodiment. Motor 1 includes stator coil 2, permanent-magnet rotor 3 and Hall element 4 as a rotor magnetic-field detecting element. Stator 10 is molded with thermoset resin 27. Permanent-magnet rotor 3 is so structured that plastic anisotropic magnet 3a is integrally formed with shaft 24. Hall element 4 is placed at a position where a waveform to be detected is approximately similar to the voltage waveform induced in stator coil 2 by permanent-magnet rotor 3.

Rotor magnet-field output circuit 12 outputs a harmonics-removed waveform of the magnet field of the stator. Specifically, rotor magnet-field output circuit 12 is structured so as to compose waveforms of two phases selected from the waveforms detected by Hall element 4 (i.e., rotor magnetic-field detecting element).

Inverter circuit 6 is formed of switching elements Q1 through Q6 arranged in a full-wave bridge connection. Driving logic circuit 5 effects on/off control of switching elements Q1 through Q6 so as to apply current to stator coil 2 in a predetermined way.

Current-waveform control circuit 7 keeps switching elements Q1 through Q6 in an undersaturated state so that the current waveform of stator coil 2 has a shape approximately similar to the waveform of the magnetic field of the rotor. As a result, torque ripple can be reduced.

AC voltage of commercial power supply is fed as follows: one side of the power supply is connected to common connecting terminal 15c. The other side is connected to either terminal 15a or terminal 15b of AC-power-supply connecting terminal 15 via external switch 23. The voltage undergoes full-wave rectification by rectifying circuit 9. Polymer capacitor 18 of small capacity is disposed as a smoothing capacitor at an output of rectifying circuit 9. DC power supply 8 having a chopper circuit therein converts the rectified voltage into low DC voltage and applies the voltage to inverter circuit 6. The output voltage fed from DC power supply 8 is controllable by voltage control circuit 14. Current detecting circuit 21 detects current passing through inverter circuit 6. Current control circuit 22 controls the output voltage of DC power supply 8 so that the average current passing through inverter circuit 6 equals to the current indicated by current-indicating circuit 19.

Figure 3:
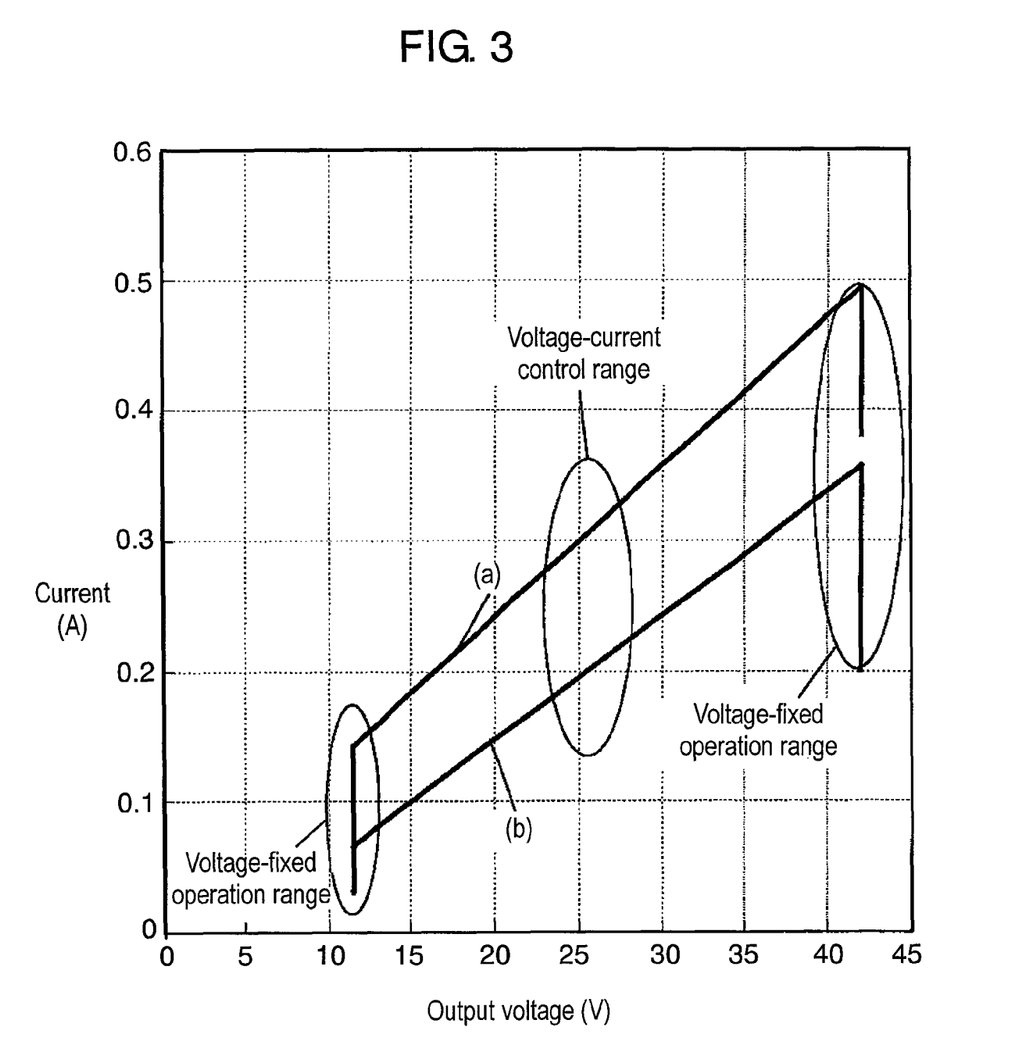
FIG. 3 illustrates current control of the motor in accordance with the first exemplary embodiment of the present invention.

Current-value change circuit 17, as shown in FIG. 3, changes the current indicated by current-indicating circuit 19 according to the output voltage fed from DC power supply 8. When commercial AC power supply 50 is connected to terminal 15a, current value (a) is used as a set value, on the other hand, when commercial AC power supply 50 is connected to terminal 15b, current value (b) is used.

FIG. 3 shows output voltage of DC power supply 8 in the horizontal axis and current in the vertical axis. As the output voltage increases, the current indicated by current-indicating circuit 19 is further increased. That is, as the voltage applied to the motor increases, the motor increases its speed and accordingly, the current increases. In a word, current control circuit 22 increases the current passing through inverter circuit 6 as the motor increases its speed.

Speed-control detecting circuit 13 outputs a signal, which tells whether commercial AC power supply 50 is connected to terminal 15a or connected to terminal 15b, to set-value change circuit 20. Receiving the signal, circuit 20 changes the current indicated by current-indicating circuit 19. In the control, the voltage to be applied to inverter circuit 6 has an upper limit in consideration of withstanding pressure of inverter circuit 6. In such a range, inverter circuit 6 operates at a constant voltage without current control.

Figure 4:
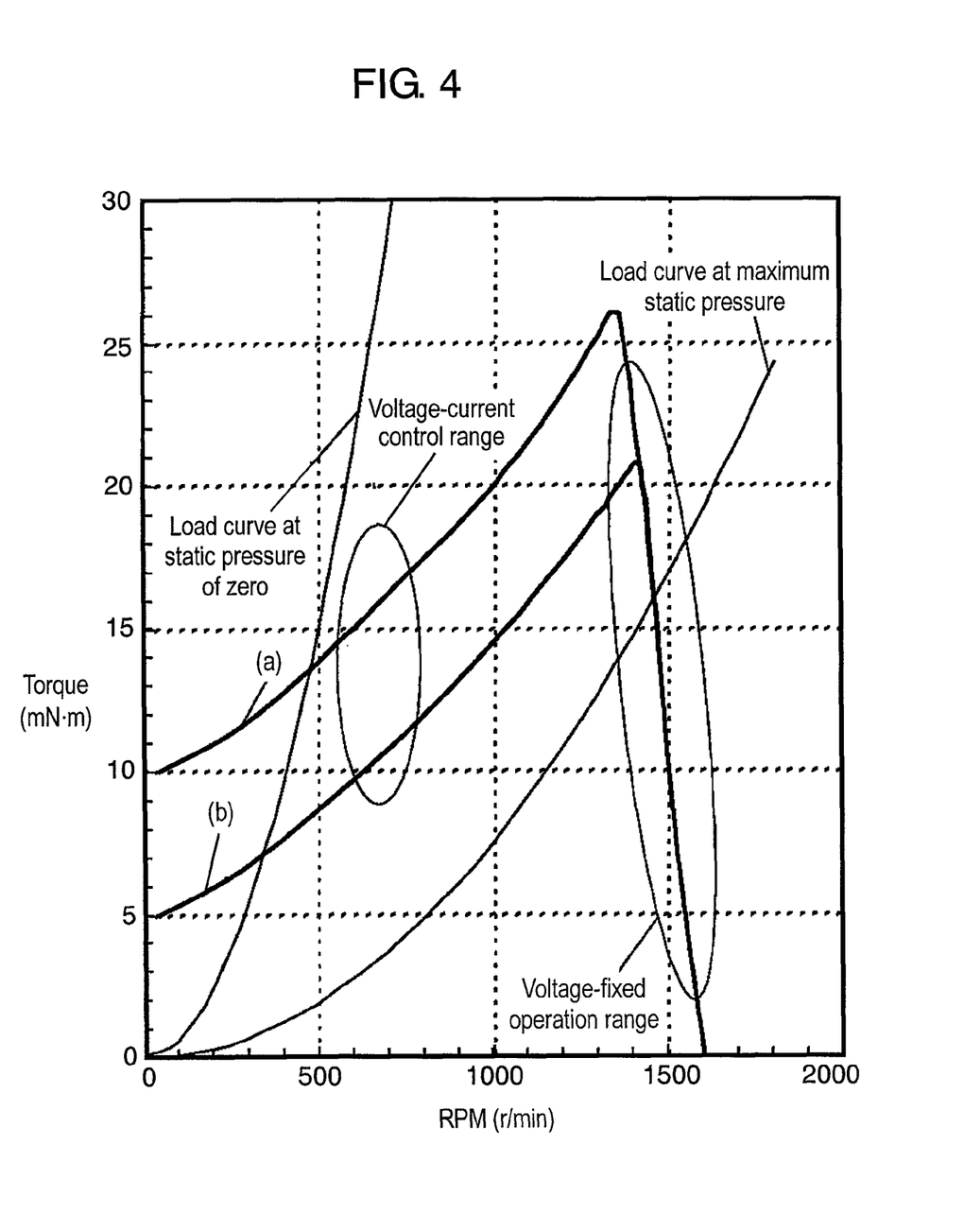
FIG. 4 shows an RPM—torque characteristic of the motor in accordance with the first exemplary embodiment of the present invention.

As described above, current control circuit 22 increases the current passing through inverter circuit 6 as the motor increases its speed, whereas decreases the current as the motor decreases its speed. The output voltage of DC power supply 8 is thus controlled. FIG. 4 shows an RPM—torque characteristic of the motor, which is obtained as a result of the output-voltage control. Increase in RPM also increases torque with a preferable gradient. RPM—torque characteristic (a) is obtained when commercial AC power supply 50 is connected to terminal 15a, and characteristic (b) is obtained when commercial AC power supply 50 is connected to terminal 15b.

Figure 6:
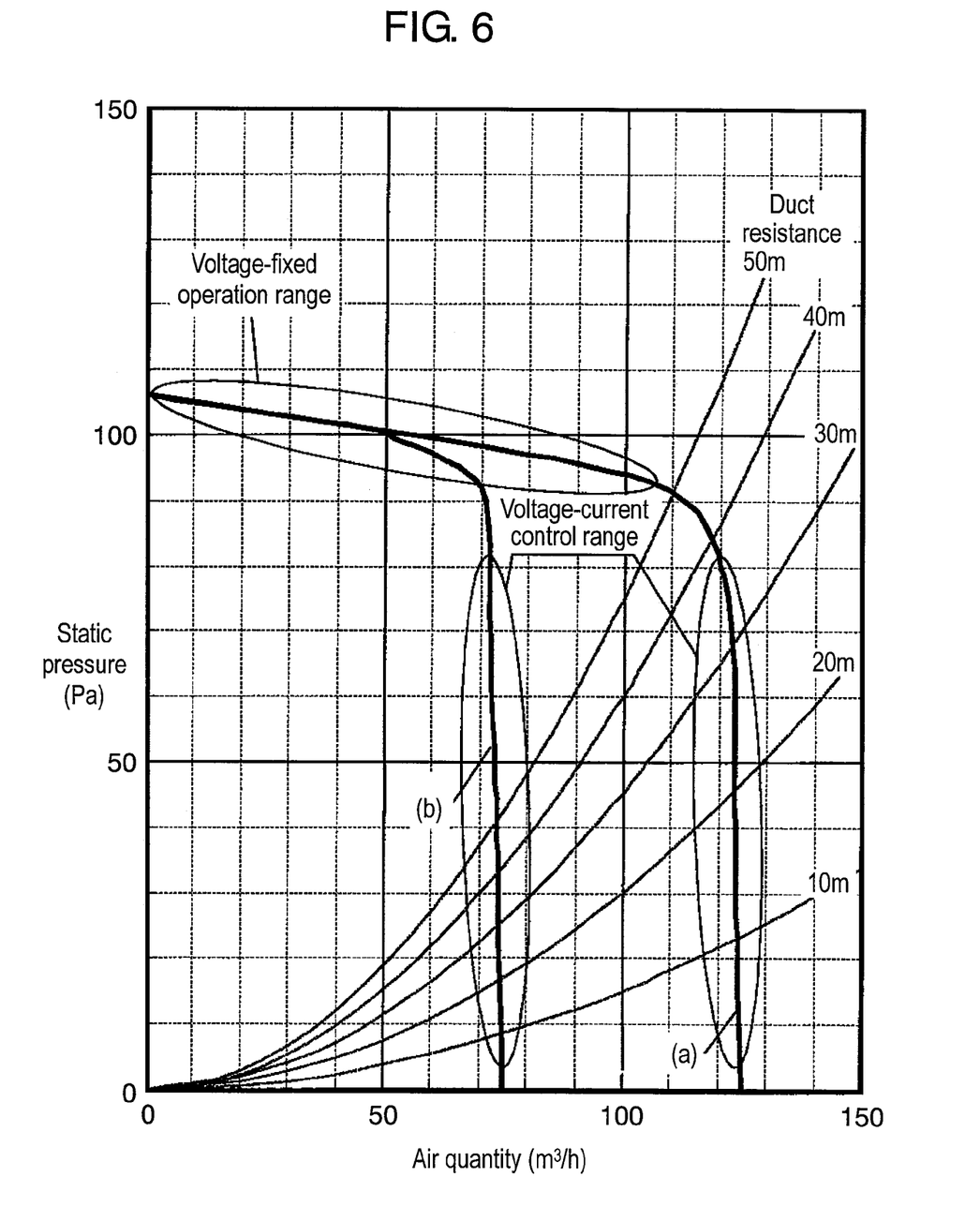
FIG. 6 shows an air quantity—static pressure characteristic of a ventilating device employing the motor in accordance with the first exemplary embodiment of the present invention.

FIG. 6 shows an air quantity—static pressure characteristic of a ventilating device employing the brushless DC motor of the present invention. The RPM—torque characteristic of the motor allows the ventilating device to have less change in air quantity even when a pressure loss-outside wind pressure, duct length or the like-varies. In this case, the RPM—torque characteristic of the motor is controllable so as to have a gradient angle suitable for each ventilating device.

The circuits enclosed in a dashed-dotted line in FIG. 1 are formed in single chip IC 16—with the exception of smoothing capacitor 18—and molded integral with the motor with thermoset resin 27 (see FIG. 2).

Figure 5:
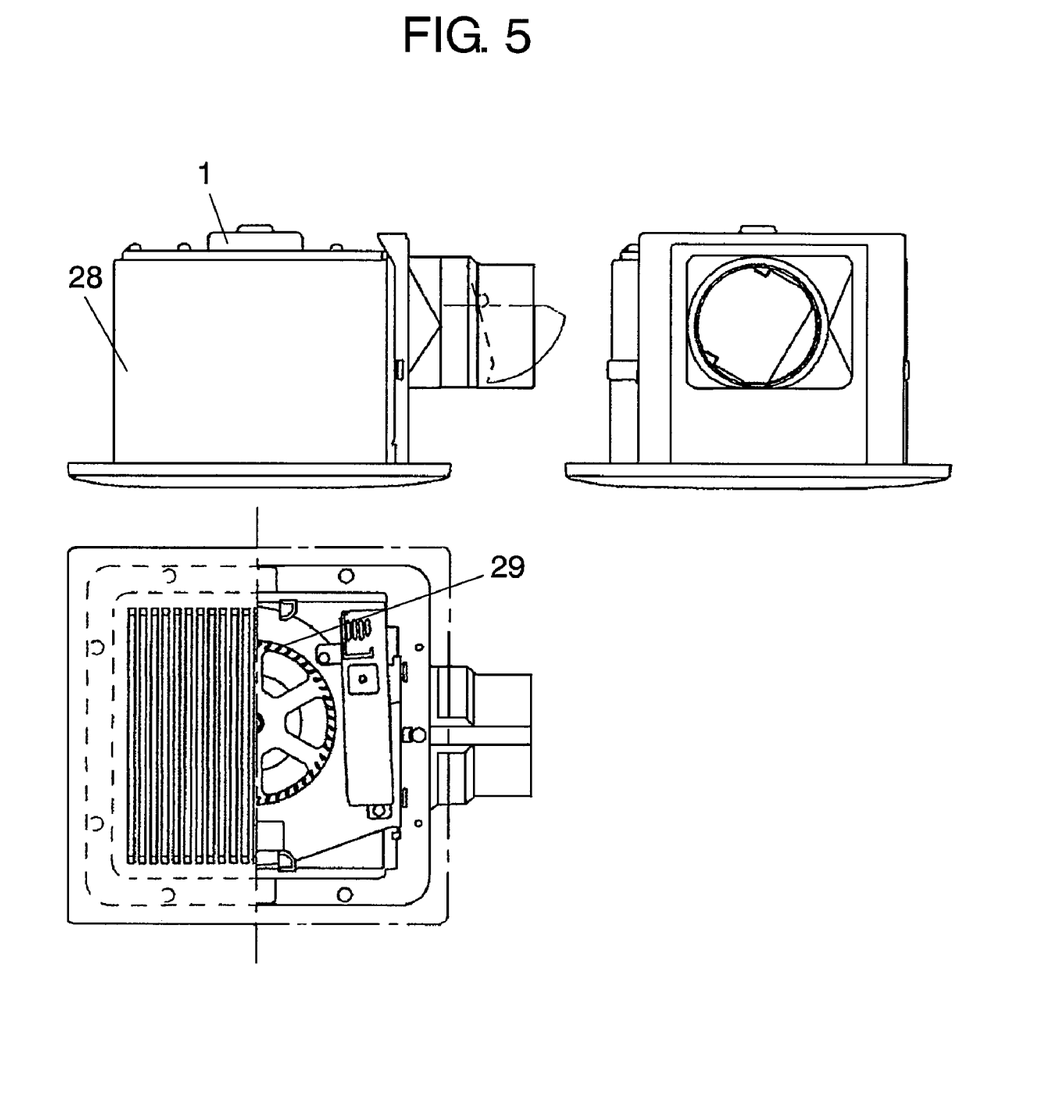
FIG. 5 shows a ventilating device employing the motor in accordance with the first exemplary embodiment of the present invention.

As described above, an electric apparatus mounting the brushless DC motor of the present invention, such as a ventilating device, has less change in air quantity even when a pressure loss-outside wind pressure, duct length or the like-varies. The brushless DC motor of the present invention is therefore suitable for the following devices: a ventilating device; an air blower; a dehumidifier; a humidifier; an air conditioner; an air purifier; a hot-water supplier; and fan filter unit. FIG. 5 shows ventilating device 28 mounting motor 1 of the present invention and built-in air blower 29.

Second Exemplary Embodiment

Figure 7:
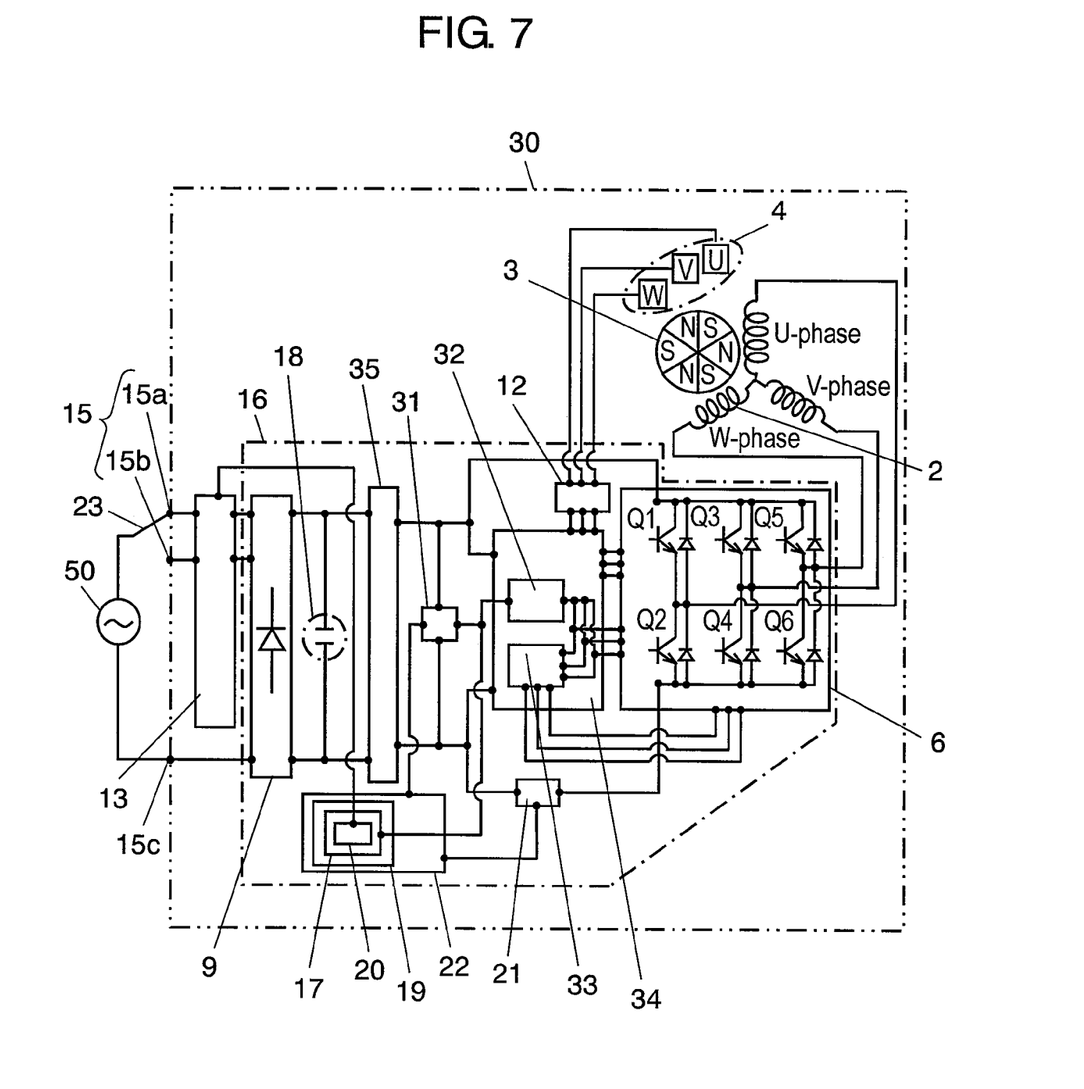
FIG. 7 is a block diagram showing a structure of a brushless DC motor in accordance with a second exemplary embodiment of the present invention.

FIG. 7 is a block diagram showing a structure of brushless DC motor 30 in accordance with the second embodiment of the present invention. The structure of the embodiment is almost the same as that of the first exemplary embodiment with the exception that the switching elements of inverter circuit 6 operate on PWM (pulse-width modulation) driving.

Driving logic circuit 34 includes PWM control circuit 32 and current-waveform control circuit 33. PWM control circuit 32 controls lower switching elements Q2, Q4 and Q6 by PWM driving. Current-waveform control circuit 33 controls on/off duty of the PWM in a manner that the current waveform of stator coil 2 has a shape approximately similar to that of the magnetic field of the rotor. Low-voltage DC power supply 35 outputs a constant voltage. Duty-indicating circuit 31 indicates the on/off duty of the PWM using a voltage obtained by reducing a voltage from low voltage DC power supply 35. Current-value change circuit 17, as shown in FIG. 8, changes the current indicated by current-indicating circuit 19 according to the duty-indicating voltage fed from duty-indicating circuit 31.

Figure 8:
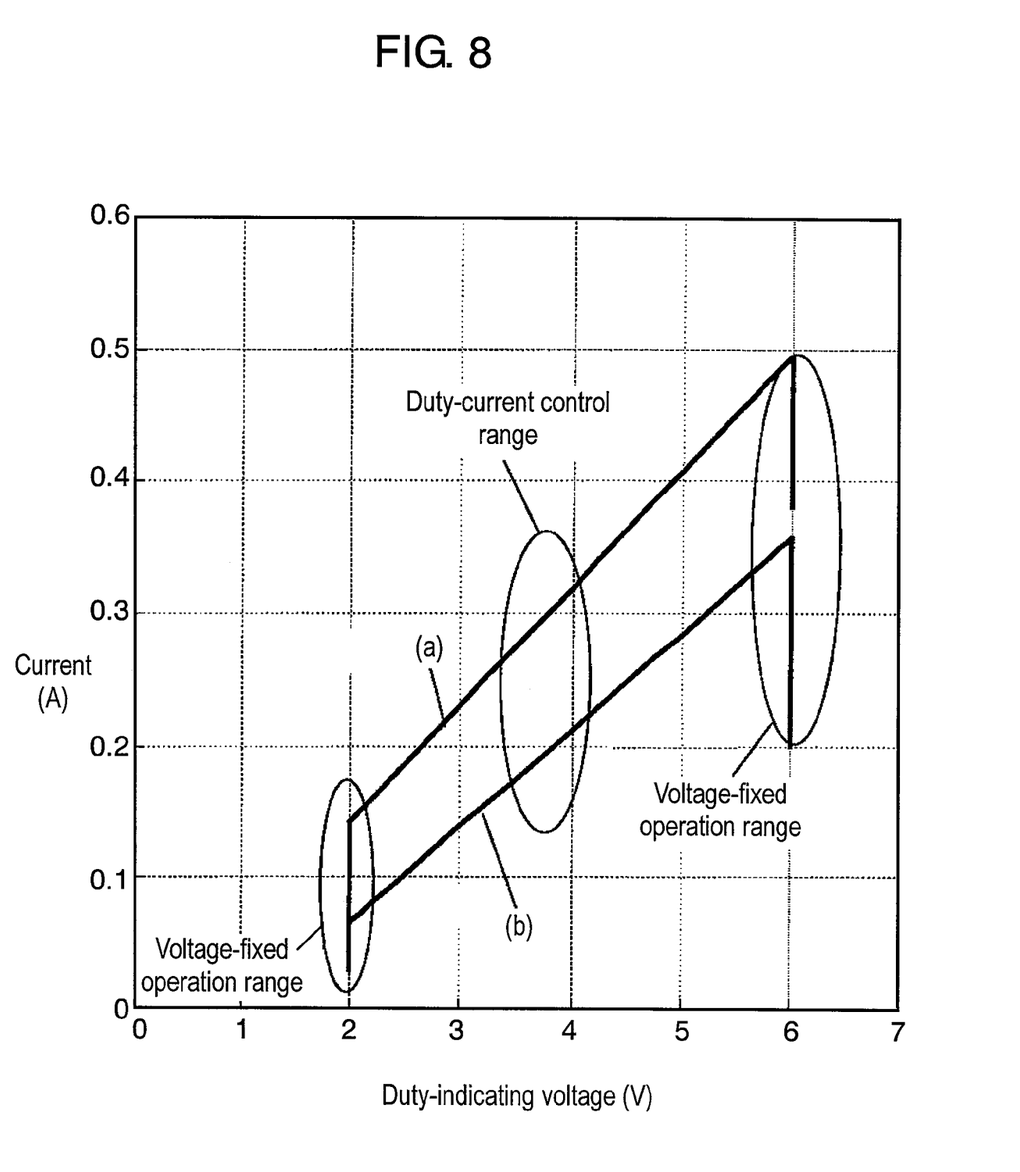
FIG. 8 illustrates current control of the motor in accordance with the second exemplary embodiment of the present invention.

As shown in the horizontal axis of the graph of FIG. 8, increase in duty-indicating voltage (on duty) further increases the current indicated by current-indicating circuit 19. That is, increase in the voltage applied to the motor increases the speed of the motor and also increases the current. In a word, current control circuit 22 increases current passing through inverter circuit 6 as the motor increases its speed.

In other words, current control circuit 22 controls the on/off duty of the PWM as follows: increasing the current passing through inverter circuit 6 when the speed of the motor increases and decreasing the current when the speed decreases. The control brings preferable result, as is in the first exemplary embodiment, offering the RPM—torque characteristic of the motor in which torque increases with a preferable gradient as rotation speed increases. Therefore, when such a motor is employed for a ventilating device, the device has less change in air quantity even when a pressure loss varies.

Third Exemplary Embodiment

Figure 9:
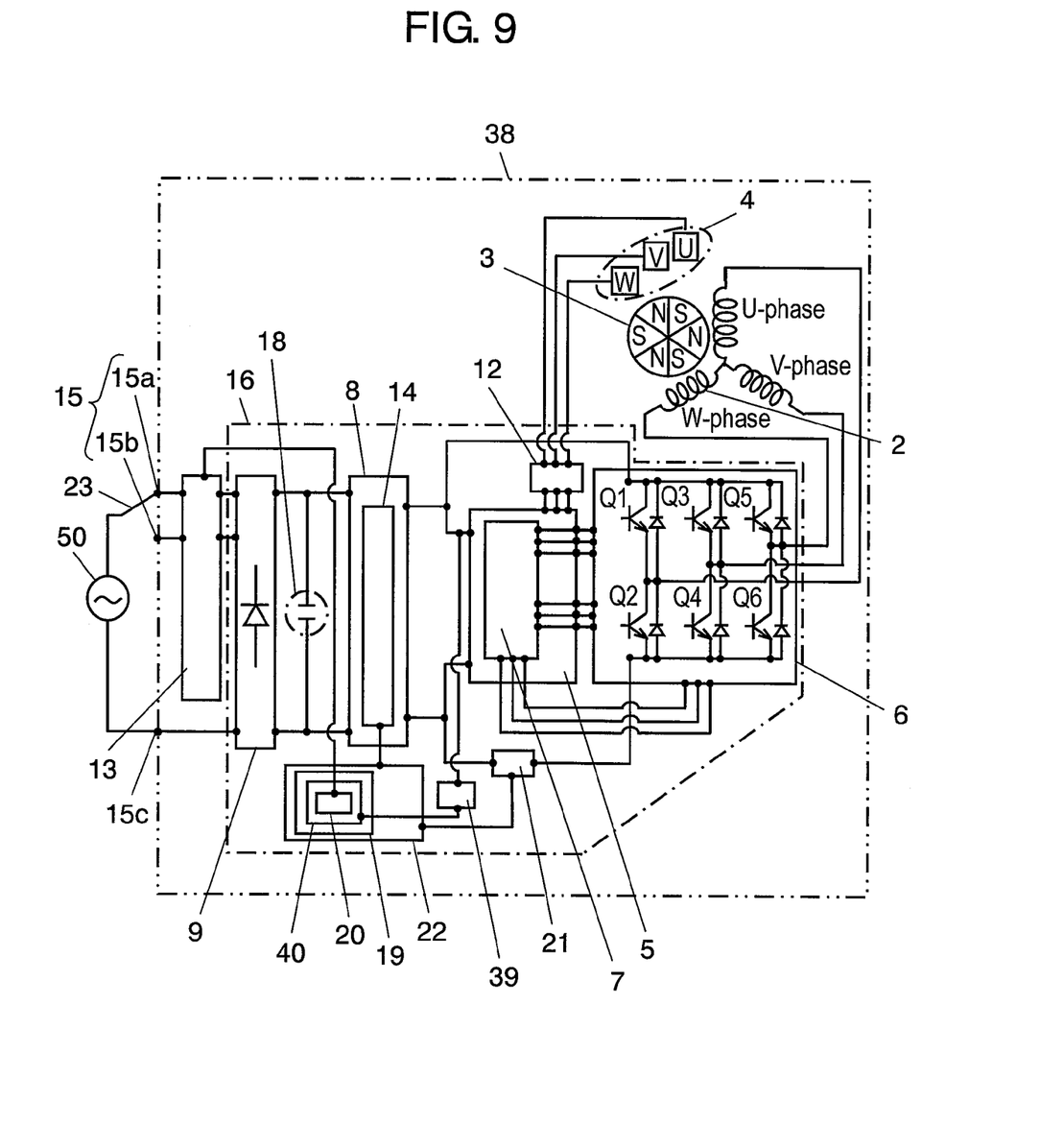
FIG. 9 is a block diagram showing a structure of a brushless DC motor in accordance with a third exemplary embodiment of the present invention.

FIG. 9 is a block diagram showing a structure of brushless DC motor 38 in accordance with the third exemplary embodiment of the present invention. Current-value change circuit 40, as shown in FIG. 10, changes the current indicated by current-indicating circuit 19 step-by-step according to the output voltage of DC power supply 8 judged by voltage-range judging circuit 39.

Figure 10:
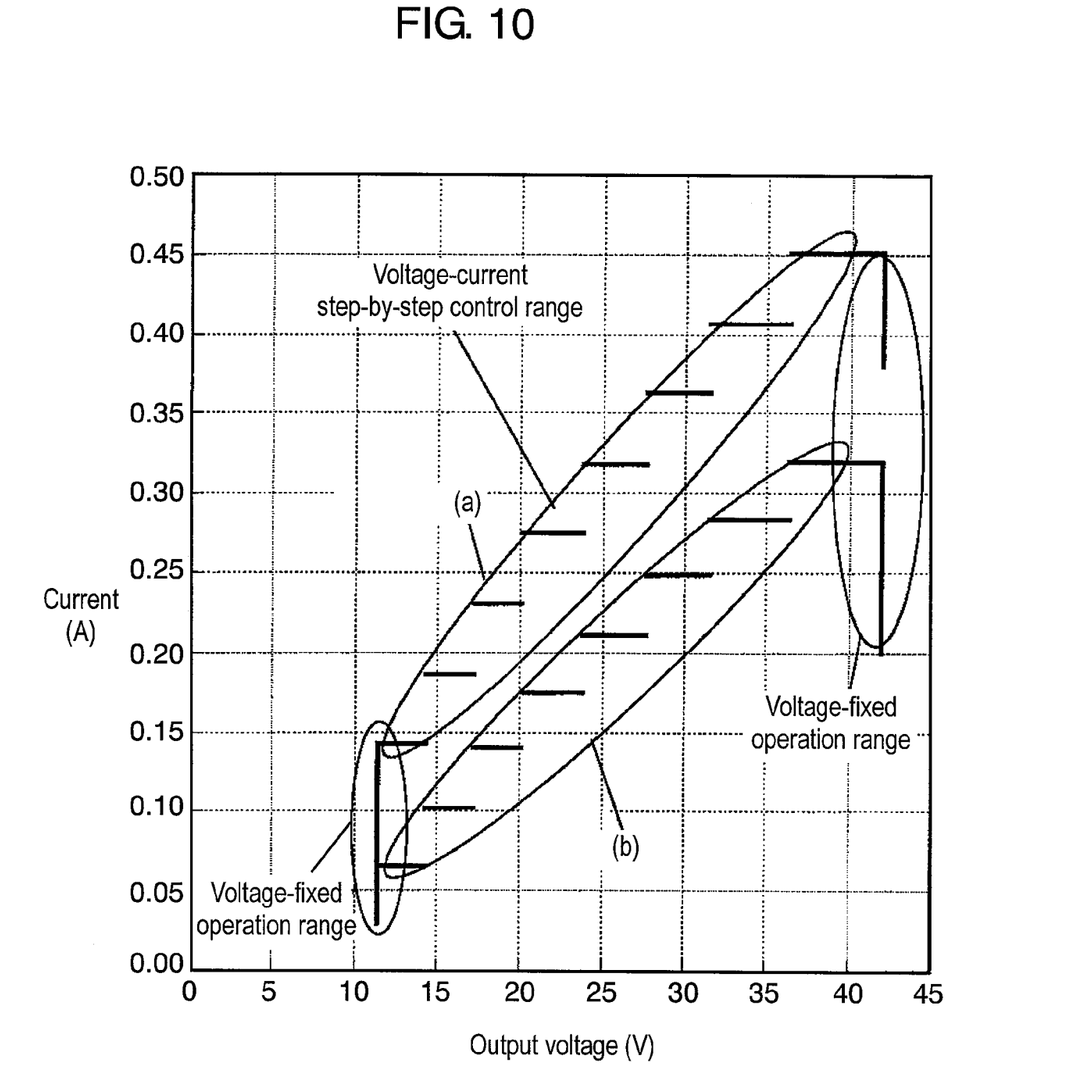
FIG. 10 illustrates current control of the motor in accordance with the third exemplary embodiment of the present invention.

As shown in the horizontal axis of the graph of FIG. 10, current-value change circuit 40 further increases the current indicated by current-indicating circuit 19 in a step-by-step manner according to step-by-step increase in output voltage of DC power supply 8. That is, increase in the voltage applied to the motor increases the speed of the motor and also increases the current. Current control circuit 22 increases current passing through inverter circuit 6 as the motor increases its speed.

Figure 11:
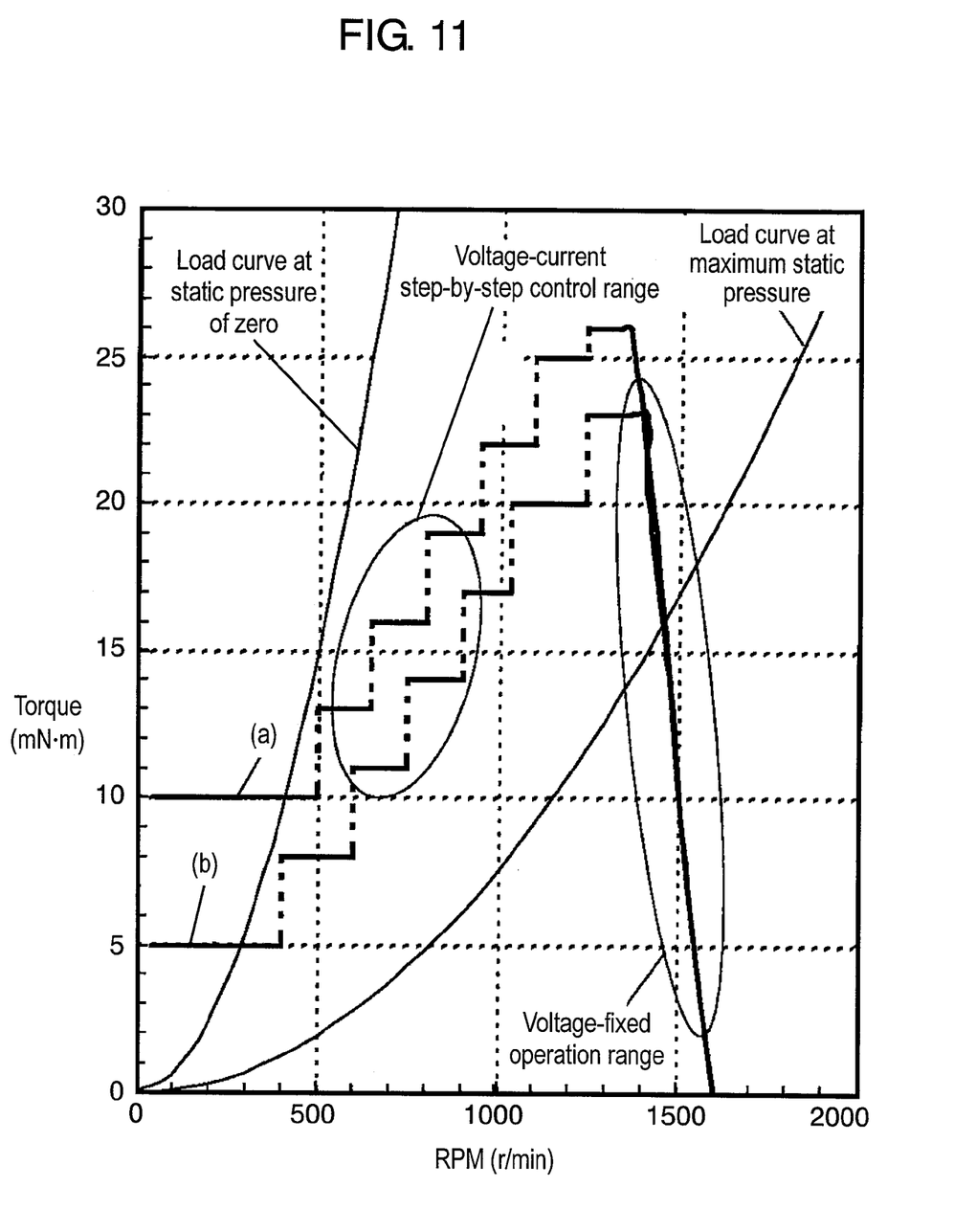
FIG. 11 shows an RPM—torque characteristic of the motor in accordance with the third exemplary embodiment of the present invention.

The control offers, as shown in FIG. 11, the RPM—torque characteristic of the motor in which torque increases with a step-by-step change as rotation speed increases.

Figure 12:
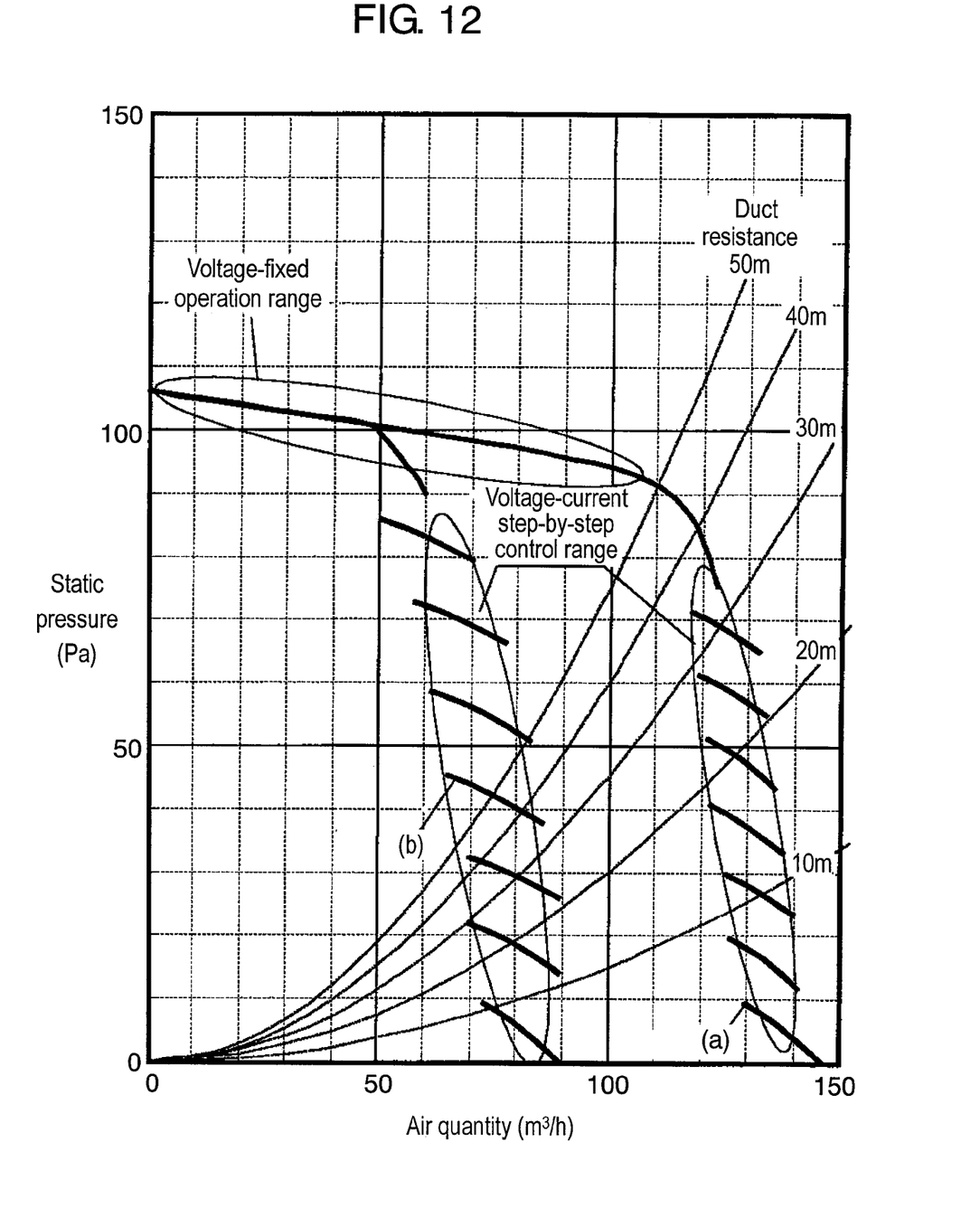
FIG. 12 shows air quantity—static pressure characteristic of a ventilating device employing the motor in accordance with the third exemplary embodiment of the present invention.

The structure of the embodiment is similar to that of the first embodiment with the exception of the step-by-step increase in torque. Therefore, as shown in FIG. 12, when the motor is employed for a ventilating device, the device has less change in air quantity even when a pressure loss varies.

Fourth Exemplary Embodiment

Figure 13:
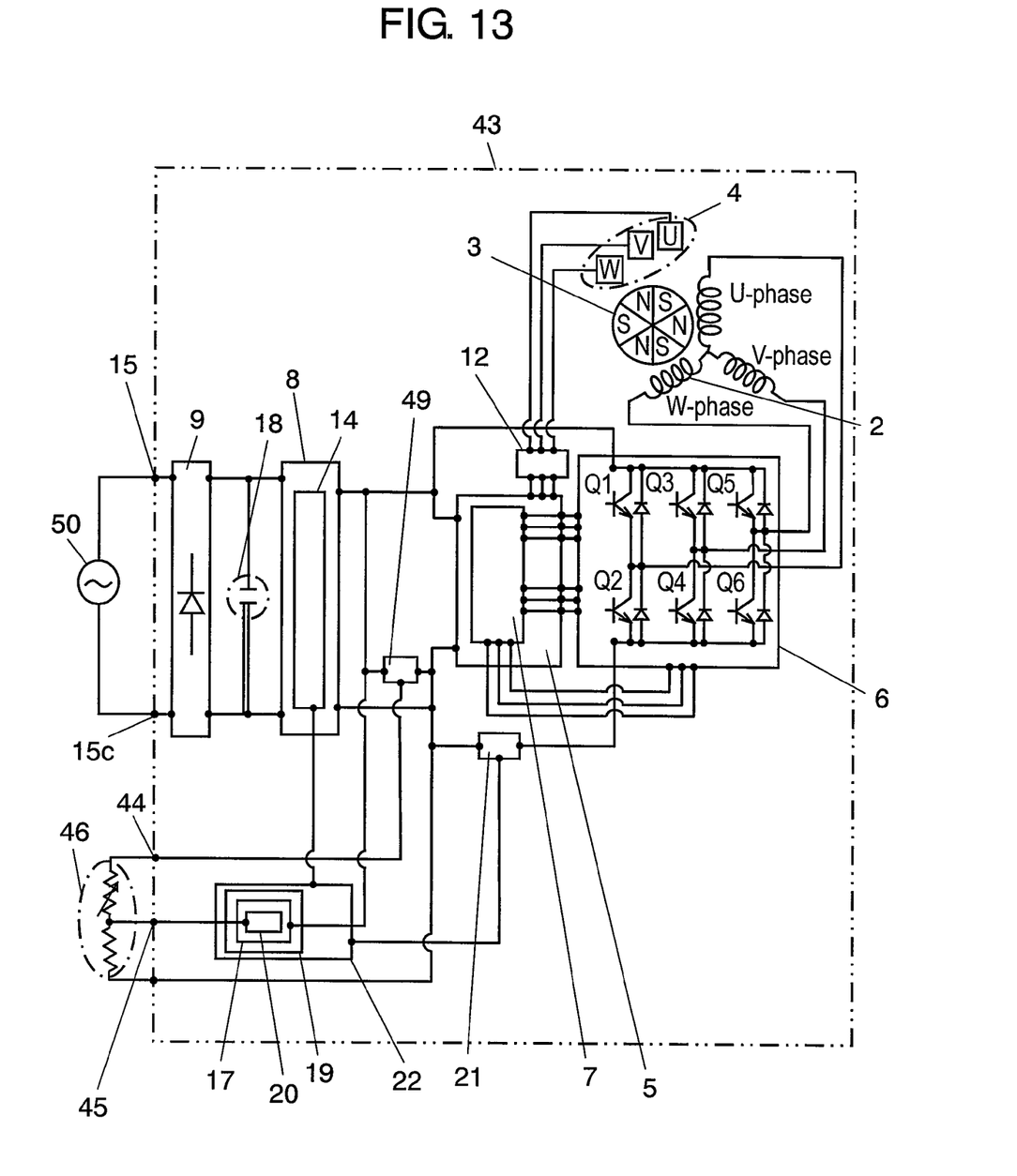
FIG. 13 is a block diagram showing a structure of a brushless DC motor in accordance with a fourth exemplary embodiment of the present invention.

FIG. 13 is a block diagram showing a structure of brushless DC motor 43 in accordance with the fourth exemplary embodiment of the present invention. Voltage reducing circuit 49 reduces DC voltage fed from DC power supply 8 down to 5V. The reduced voltage of 5V is lead outside motor 43 via low DC-voltage leading terminal 44 and fed into current setting circuit 46 disposed outside motor 43. Receiving the DC voltage of 5V, current setting circuit 46 further reduces the voltage and indicates a reference value of the current in inverter circuit 6 via current-setting input terminal 45. Current-value change circuit 17 changes the reference value according to output voltage from DC power supply 8. The structure of the embodiment differs from that of the first embodiment in only the process described above.

INDUSTRIAL APPLICABILITY

A brushless DC motor of the present invention is suitable for the following devices: a ventilating device; an air blower; a dehumidifier; a humidifier; an air conditioner; an air purifier; a hot-water supplier; and fan filter unit.

The invention claimed is:

1. A brushless DC motor comprising:
   a stator having a stator coil;
   a permanent-magnet rotor disposed opposite to the stator;
   a rotor magnetic-field detecting element for detecting a magnetic field of the permanent-magnet rotor;
   a rectifying circuit for rectifying AC voltage of an AC power supply in full-wave;
   a DC power supply for converting the voltage rectified by the rectifying circuit into a low DC voltage;
   an inverter circuit having a plurality of switching elements in full-wave bridge connection, to which an output voltage of the DC power supply is applied;
   a driving logic circuit for controlling the switching elements to pass current through the stator coil;
   a current control circuit for controlling current passing through the inverter circuit; and
   a current-indicating circuit for indicating the current passing through the inverter circuit,
   wherein the current control circuit controls the output voltage of the DC power supply so that the current passing through the inverter circuit equals the current indicated by the current-indicating circuit, and the current indicated by the current-indicating circuit is further increased as the output voltage increases, and
   wherein the current control circuit increases the current passing through the inverter circuit as the motor increases its speed.

2. The brushless DC motor of claim 1, wherein the inverter circuit is driven by PWM control.

3. The brushless DC motor of claim 1, wherein the rotor magnetic-field detecting element is placed at a position where a waveform to be detected is similar to a voltage waveform induced in the stator coil by the permanent-magnet rotor, and the driving logic circuit further includes a current-waveform control circuit that feeds current, whose waveform is similar to the waveform detected by the rotor magnetic-field detecting element, to the stator coil.

4. The brushless DC motor of claim 3, wherein the inverter circuit is driven by PWM control.

5. The brushless DC motor of claim 1, wherein the current control circuit increases the current passing through the inverter circuit in a step-by-step manner as the motor increases its speed.

6. The brushless DC motor of claim 5, wherein the inverter circuit is driven by PWM control.

7. The brushless DC motor of claim 1, wherein the rotor magnetic-field detecting element is placed at a position where a waveform to be detected is similar to a voltage waveform induced in the stator coil by the permanent-magnet rotor, the driving logic circuit further includes a current-waveform control circuit that feeds current, whose waveform is similar to the waveform detected by the rotor magnetic-field detecting element, to the stator coil, and the current control circuit increases the current passing through the inverter circuit in a step-by-step manner as the motor increases its speed.

8. The brushless DC motor of claim 7, wherein the inverter circuit is driven by PWM control.

9. The brushless DC motor of claim 1, wherein a permanent magnet of the permanent-magnet rotor is a polar anisotropic magnet.

10. The brushless DC motor of claim 1 further comprising:
a rotor magnetic-field output circuit that composes waveforms of two phases selected from the waveforms detected by the rotor magnetic-field detecting element.

11. The brushless DC motor of claim 1 further comprising:
an AC-power-supply connecting terminal having a plurality of terminals connected to the AC power supply and a setting-value change circuit, wherein the setting-value change circuit changes the current indicated by the current-indicating circuit according to which terminal of the plurality of terminals is connected to the AC power supply.

12. The brushless DC motor of claim 1 further comprising:
a current setting circuit disposed outside the motor, wherein the current setting circuit sets the current indicated by the current-indicating circuit.

13. An electric apparatus comprising:
the brushless DC motor of claim 1.

14. The electric apparatus of claim 13, wherein the electric apparatus is any one of a ventilating device; an air blower; a dehumidifier; a humidifier; an air conditioner; an air purifier; a hot-water supplier; and fan filter unit.

15. A brushless DC motor comprising:
a stator having a stator coil;
a permanent-magnet rotor disposed opposite to the stator;
a rotor magnetic-field detecting element for detecting a magnetic field of the permanent-magnet rotor;
a rectifying circuit for rectifying AC voltage of an AC power supply in full-wave;
a DC power supply for converting the voltage rectified by the rectifying circuit into a low DC voltage;
an inverter circuit having a plurality of switching elements in full-wave bridge connection, to which an output voltage of the DC power supply is applied;
a driving logic circuit for controlling the switching elements to pass current through the stator coil; and
a current control circuit for controlling current passing through the inverter circuit,
wherein the current control circuit increases the current passing through the inverter circuit as the motor increases its speed, and
wherein the rotor magnetic-field detecting element is placed at a position where a waveform to be detected is similar to a voltage waveform induced in the stator coil by the permanent-magnet rotor, and the driving logic circuit further includes a current-waveform control circuit that feeds current, whose waveform is similar to the waveform detected by the rotor magnetic-field detecting element, to the stator coil.

16. A brushless DC motor comprising:
a stator having a stator coil;
a permanent-magnet rotor disposed opposite to the stator;
a rotor magnetic-field detecting element for detecting a magnetic field of the permanent-magnet rotor;
a rectifying circuit for rectifying AC voltage of an AC power supply in full-wave;
a DC power supply for converting the voltage rectified by the rectifying circuit into a low DC voltage;
an inverter circuit having a plurality of switching elements in full-wave bridge connection, to which an output voltage of the DC power supply is applied;
a driving logic circuit for controlling the switching elements to pass current through the stator coil;
a current control circuit for controlling current passing through the inverter circuit; and
a rotor magnetic-field output circuit that composes waveforms of two phases selected from the waveforms detected by the rotor magnetic-field detecting element,
wherein the current control circuit increases the current passing through the inverter circuit as the motor increases its speed.

* * * * *